United States Patent
Park et al.

(10) Patent No.: US 8,592,095 B2
(45) Date of Patent: Nov. 26, 2013

(54) HIGH MOLECULAR NANOCOMPOSITE MEMBRANE FOR DIRECT METHANOL FUEL CELL, AND MEMBRANE-ELECTRODE ASSEMBLY AND METHANOL FUEL CELL INCLUDING THE SAME

(75) Inventors: Yong-il Park, Gumi-si (KR); Eun Hyung Kim, Daegu (KR); Sung Bum Park, Gyeongju-si (KR)

(73) Assignee: Kumoh National Institute of Technology Industry-Academic Cooperation Foundation (KR)

( * ) Notice: Subject to any disclaimer, the term of this patent is extended or adjusted under 35 U.S.C. 154(b) by 308 days.

(21) Appl. No.: 13/016,245

(22) Filed: Jan. 28, 2011

(65) Prior Publication Data
US 2011/0183231 A1    Jul. 28, 2011

(30) Foreign Application Priority Data
Jan. 28, 2010  (KR) .................... 10-2010-0008015

(51) Int. Cl.
*H01M 8/10*    (2006.01)
(52) U.S. Cl.
USPC ........................... 429/494; 429/535
(58) Field of Classification Search
USPC ................... 429/494, 535; 524/789
See application file for complete search history.

(56) References Cited

U.S. PATENT DOCUMENTS

| | | |
|---|---|---|
| 5,795,496 A | 8/1998 | Yen et al. |
| 5,919,583 A | 7/1999 | Grot et al. |
| 6,194,474 B1 | 2/2001 | Kerres et al. |
| 6,224,994 B1 * | 5/2001 | Asukabe et al. ............ 429/494 |
| 6,510,047 B2 | 1/2003 | Meiners et al. |
| 6,824,909 B2 * | 11/2004 | Mathias et al. ............ 429/494 |
| 7,838,616 B2 * | 11/2010 | Fukushima et al. ...... 429/494 X |
| 2003/0170521 A1 * | 9/2003 | Zhang ......................... 429/33 |
| 2005/0227135 A1 | 10/2005 | Chalkova et al. |

FOREIGN PATENT DOCUMENTS

JP    2004103295 A    4/2004

* cited by examiner

*Primary Examiner* — Stephen J. Kalafut
(74) *Attorney, Agent, or Firm* — Levenfeld Pearlstein, LLC

(57) ABSTRACT

A high molecular nanocomposite membrane for a Direct Methanol Fuel Cell (DMFC), and a Membrane-Electrode Assembly (MEA) and a methanol fuel cell including the same membrane. The high molecular nanocomposite membrane for a DMFC includes a perflurorosulfonic acid polymer (Nation®), high molecular membrane in which hydrophobic silica nanoparticles made from a silane compound having a water repellent functional group are dispersed. Since the high molecular nanocomposite membrane for a DMFC has lower permeability of methanol than a commercially available Nation® high molecular membrane, the MEA fabricated using the high molecular nanocomposite membrane has little crossover of reaction fuel at the negative electrode. In addition, the methanol fuel electrode fabricated using the MEA that includes the high molecular nanocomposite membrane can decrease fuel loss and voltage loss.

16 Claims, 4 Drawing Sheets

| wavenumber(cm⁻¹) | assignment |
|---|---|
| ① ~ 1200 | $SO_3^-$ stretching |
| ② ~ 1147 | O=S=O stretching |
| ③ ~ 1133 | Si-O-Si |
| ④ 1070 ~ 1100 | Si-O-C stretching |
| ⑤ ~ 1060 | $SO_3^-$ stretching |
| ⑥ 980 | C-F stretching |
| ⑦ 970 | C-O-C stretching |

HIGH MOLECULAR NANOCOMPOSITE MEMBRANE FOR DIRECT METHANOL FUEL CELL, AND MEMBRANE-ELECTRODE ASSEMBLY AND METHANOL FUEL CELL INCLUDING THE SAME

CROSS REFERENCE TO RELATED APPLICATION

The present application claims priority from Korean Patent Application Number 10-2010-0008015 filed on Jan. 28, 2010, the entire contents of which application are incorporated herein for all purposes by this reference.

BACKGROUND OF THE INVENTION

1. Field of the Invention

The present invention relates to a high molecular nanocomposite membrane for a Direct Methanol Fuel Cell (DMFC), which includes a Nafion® high molecular membrane in which hydrophobic silica nanoparticles are dispersed, and a membrane-electrode assembly and a methanol fuel cell including the same membrane.

2. Description of Related Art

A fuel cell is an electrochemical energy converting device that directly converts the chemical energy of fuel into electrical energy through an electrochemical reaction. Compared to combustion engines, fuel cells exhibit high energy conversion efficiency and make very little noise during operation. Since fuel cells are an environmentally friendly power supply device since they do not produce pollutants, such as nitrogen oxides ($NO_x$) and sulfur oxides ($SO_x$), they are attracting a lot of interest and research.

Nowadays, in response to the increasing use of portable devices, such as notebook computers, and the trend toward high performance and multi-functionality, existing power supply devices are encountering limitations, and the development of a novel portable power supply device that exhibits high capacity and a small size is required. A Direct Methanol Fuel Cell (DMFC), which uses methanol as fuel, has advantages in that methanol has high volumetric energy density and in that it can stably store fuel and be easily transported. Under the current circumstances, in which the infrastructure for the supply of hydrogen has not been established, the simple fuel supply system of the DMFC, in which liquid methanol can be directly supplied to an anode without having to reform hydrogen from other types of fuel, as well as the simple structure of the entire system, enables the DMFC to be used as a small-size portable power supply device. In addition, since the DMFC not only operates at room temperature, but also can be miniaturized and sealed, it can be used for various applications, such as nonpolluting vehicles, home power generating systems, mobile communication devices, medical instruments, military equipment, equipment for the space industry, and mobile electronics.

The DMFC uses an aqueous methanol solution as fuel, and the swelling of a solid high molecular membrane occurs depending on the concentration of methanol in the aqueous methanol solution. The swelling is a phenomenon that occurs when the aqueous methanol solution is used as fuel, in which a portion of the fuel that is not oxidized by an electrochemical reaction permeates into the high molecular membrane to migrate from an anode to a cathode, thereby being wasted and causing a deterioration in performance at the cathode due to mixed potential. In order to solve this problem, the development of a DMFC-dedicated solid high molecular membrane is required.

Methods of reducing the permeability of the aqueous methanol solution using solid high molecules or using heat-resistant high molecules in the manufacture of the DMFC-dedicated solid high molecular membrane have been proposed (U.S. Pat. Nos. 5,795,496, 6,194,474, and 6,510,047). Although these methods can significantly decrease the permeation of methanol, they have a problem in that the ion conductivity of the high molecular membrane greatly decreases, thereby causing a deterioration in performance, such as reduced output density.

As another method of manufacturing a DMFC-dedicated solid high molecular membrane, a method of dispersing inorganic particles in the high molecular membrane was proposed (U.S. Pat. No. 5,919,583). However, this method has a problem in that the inorganic material that is added decreases the conductivity of hydrogen ions.

Although methanol has high volumetric energy density, the electrochemical reactivity of electrodes is low. Therefore, DMFC requires the use of a greater amount of expensive platinum (Pt) catalyst, which is required for the acidification of methanol, compared to a Polymer Electrolyte Membrane Fuel Cell (PEMFC). In addition, the catalyst has to be used in the form of an alloy combined with other metal elements, such as ruthenium (Ru), in order to raise the activity of the catalyst, since an unstable product such as CO or HCO, which is produced during the oxidation of methanol, causes catalyst poisoning. In addition, methanol crossover occurring when methanol migrates from the anode to the cathode through the high molecular membrane used as electrolyte decreases the difference in potential between the anode and the cathode, thereby causing a deterioration in the performance of the cell and a partial loss of fuel. For these reasons, at present, a diluted aqueous methanol solution having a concentration of 3 wt % to 5 wt % is generally used, and this is the main factor that reduces the performance of the fuel cell.

In addition, the high molecular electrolyte membrane that constitutes the fuel cell is an electronic insulator but conducts hydrogen ions. In general, the thinner the membrane is, the smaller the overvoltage due to Ohmic voltage drop (or IR drop) becomes. Also, the lower the equivalent weight is, the better the ion exchange performance becomes. So, the high molecular electrolyte membrane that is thick and has a low equivalent weight can be determined to be an electrolyte membrane having preferable properties. However, if the membrane is too thin, mechanical strength becomes weak, and a crossover phenomenon, in which gases supplied to both electrodes migrate to the counterpart electrodes through the membrane, may occur, thereby reducing the performance of the membrane. If the equivalent weight is too small, flooding may occur, thereby reducing the performance of the membrane. As is reported by Narayanon et al., although the electrolyte membrane itself is advantageous if the equivalent weight is small, the activity of the membrane may be reduced by flooding if a material that has a small equivalent weight is used for the electrolyte membrane used in the electrode. Therefore, the high molecular electrolyte membrane is advantageous if the equivalent weight is great.

At present, a Nafion® high molecular membrane is commercially distributed as a hydrogen ion-conductive high molecular membrane. However, the crossover of reaction fuel in the Nafion® high molecular membrane is a major obstacle that makes the DMFC difficult to be commercially distributed. The crossover of reaction fuel is a phenomenon, in which fuel migrates from a fuel electrode (negative electrode) to an air electrode (positive electrode) instead of being completely oxidized when the fuel is supplied to the fuel electrode. Such methanol crossover is the toughest challenge to overcome in the methanol fuel cell. In the present circumstances, the crossover causes fuel loss of 20% or more and voltage loss of 0.1V or more.

The information disclosed in this Background of the Invention section is only for the enhancement of understanding of the background of the invention, and should not be taken as an acknowledgment or any form of suggestion that this information forms a prior art that would already be known to a person skilled in the art.

BRIEF SUMMARY OF THE INVENTION

The inventors have made studies in order to solve the foregoing problems, and as a result, have accomplished the present invention by finding that, when hydrophobic silica nanoparticles made from a silane compound having a water repellent functional group are dispersed in a solid high molecular membrane for a fuel cell, hydrogen ion conductivity can be increased by increasing the content of water in order to effectively deliver hydrogen ions, the methanol permeability of the membrane can be decreased, and the crossover of fuel can be decreased. Therefore, the present invention is intended to provide a high molecular nanocomposite membrane for a Direct Methanol Fuel Cell (DMFC), and a method of manufacturing the same membrane. Also provided are a membrane-electrode assembly including the same membrane and a methanol fuel cell, the fuel efficiency of which is improved.

The present invention relates to a high molecular nanocomposite membrane for a Direct Methanol Fuel Cell (DMFC), which includes a perflurorosulfonic acid polymer ( such as those available under the trade name Nafion ® from Dupont) high molecular membrane in which hydrophobic silica nanoparticles made from a silane compound having a water repellent functional group are dispersed.

In another aspect of the present invention, the method of manufacturing a high molecular nanocomposite membrane for a DMFC includes the following steps of: dispersing fluoroalkylsilane throughout ion clusters inside a Nafion® membrane by dipping the Nafion® membrane in a diluted fluoroalkylsilane solution; forming hydrophobic silica nanoparticles through hydrolysis and polycondensation of the fluoroalkylsilane dispersed through the ion clusters by dipping the Nafion® membrane in an aqueous methanol solution; drying the Nafion® high molecular membrane, in which the hydrophobic silica nanoparticles are formed, at a temperature ranging from 70° C. to 90° C. for 18 to 26 hours; re-drying the dried Nafion® high molecular membrane at a temperature ranging from 100° C. to 120° C. for 2 to 3 hours; acidifying the re-dried Nafion® high molecular membrane in a 0.1 to 0.5M aqueous $H_2SO_4$ solution; and cleaning and drying the acidified Nafion® high molecular membrane.

In a further aspect of the present invention, the membrane-electrode assembly includes the high molecular nanocomposite membrane for a DMFC, a negative electrode bonded to one portion of the high molecular nanocomposite membrane, and a positive electrode bonded to the other portion of the high molecular nanocomposite membrane.

In a further another aspect of the invention, the fuel cell includes the membrane-electrode assembly.

According to embodiments of the invention, the high molecular nanocomposite membrane for a DMFC can reduce the permeability of methanol and decrease the crossover of reaction fuel at a negative electrode compared to a commercially available Nafion® high molecular membrane, thereby enhancing the performance of the methanol fuel cell that incorporates the same membrane. In addition, it is possible to adjust the degree of swelling with respect to the methanol solution, and reduce the permeability due to the degree of swelling. Furthermore, since a functional group having hydrogen ion conductivity is introduced into a conductive inorganic material having an interlayer structure, the hydrogen ion conductivity of the high molecular membrane can also be increased.

The methods and apparatuses of the present invention have other features and advantages which will be apparent from, or are set forth in more detail in the accompanying drawings, which are incorporated herein, and in the following Detailed Description of the Invention, which together serve to explain certain principles of the present invention.

DETAILED DESCRIPTION OF THE INVENTION

Figure 1:
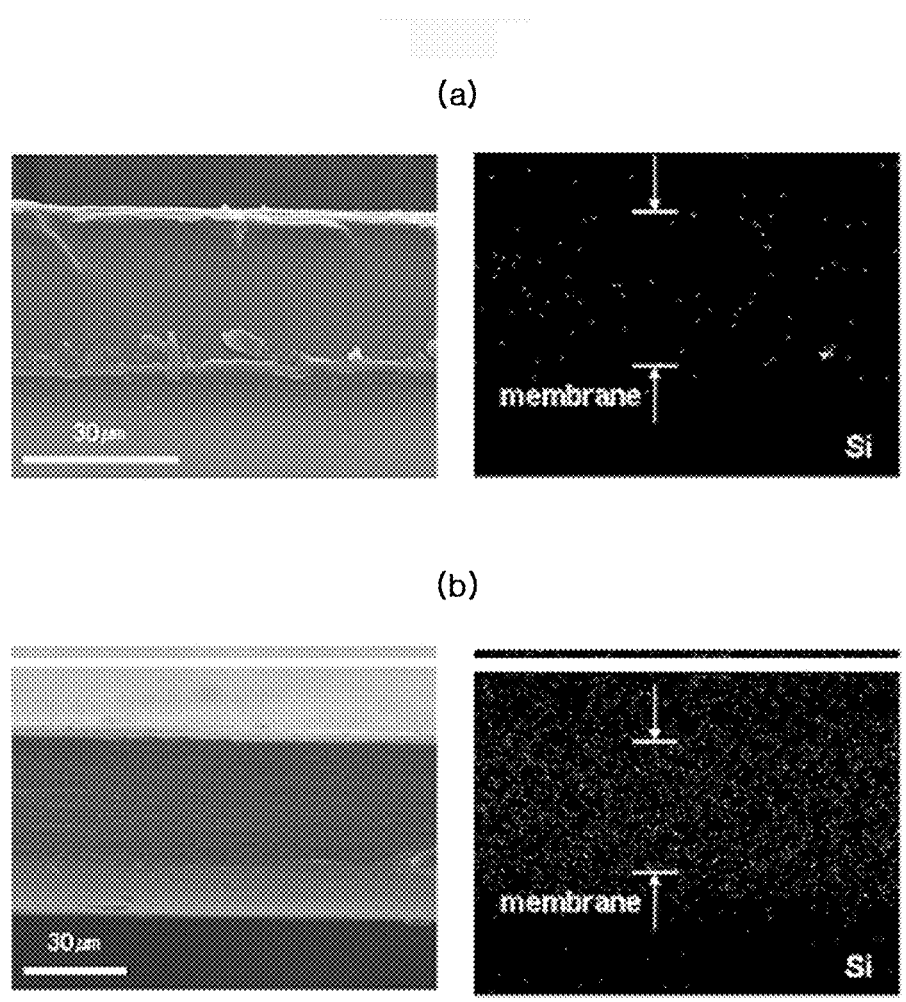
FIG. 1 is pictures showing side SEM images and EDS experiment results of a commercially available Nafion® 112 membrane used in Experimental Example 1 and a nanocomposite membrane manufactured in Example 1.

The present invention will now be described more fully hereinafter.

The present invention relates to a high molecular nanocomposite membrane for a Direct Methanol Fuel Cell (DMFC), which includes a perflurorosulfonic acid polymer ( such as those available under the trade name Nafion ® from Dupont) high molecular membrane in which hydrophobic silica nanoparticles made from a silane compound having a water repellent functional group are dispersed.

The Nafion® high molecular membrane can be implemented with Nafion® (commercially available from Dupont) that is a solid high molecular membrane. The solid high molecular membrane can contain water, since side chains contain a hydrophilic group although the backbone of high molecules that form this high molecular membrane is hydrophobic. So, hydrogen ions migrate through clusters formed by water that the solid high molecular membrane contains.

In an embodiment of the present invention, the hydrophobic silica nanoparticles can be produced from a silane compound having a water repellent functional group.

Although the silane compound is not specifically limited, an available example thereof can be fluoroalkylsilane, preferably, fluoro(C1-C12)alkylsilane, and more preferably, (heptadecafluoro-1,1,2,2-tetrahydrodecyl)triethoxysilane. In addition, in the high molecular nanocomposite membrane for a DMFC, which contains Nafion®, the content of the hydrophobic silica nanoparticles is in the range from 1 wt % to 25 wt %, and preferably, from 5 wt % to 20 wt %. If the content of the hydrophobic silica nanoparticles is less than 1 wt %, it is too small to decrease the permeation of methanol. If the content exceeds 25 wt %, the effect is no more enhanced. Therefore, it is preferable to use the hydrophobic silica nanoparticles in this range.

In addition, the invention relates to a method of manufacturing a high molecular nanocomposite membrane for a DMFC. The method includes a first step of dispersing fluoroalkylsilane throughout ion clusters inside a Nafion® membrane by dipping the Nafion® membrane in a diluted fluoroalkylsilane solution; a second step of forming hydrophobic silica nanoparticles through hydrolysis and polycondensation of the fluoroalkylsilane dispersed through the ion clusters by dipping the Nafion® membrane in an aqueous methanol solution; a third step of drying the Nafion® high molecular membrane, in which the hydrophobic silica nanoparticles are formed, at a temperature ranging from 70° C. to 90° C. for 18 to 26 hours; a fourth step of re-drying the dried Nafion® high molecular membrane at a temperature ranging from 100° C. to 120° C. for 2 to 3 hours; a fifth step of acidifying the re-dried Nafion® high molecular membrane in a 0.1 to 0.5M aqueous $H_2SO_4$ solution; and a sixth step of cleaning and drying the acidified Nafion® high molecular membrane.

At the first step, the Nafion® membrane is not specifically limited as to types, but can be implemented with a commercially available Nafion® membrane. The Nafion® membrane can be, preferably, one selected from among Nafion® 112, Nafion® 113, Nafion® 115, and Nafion® 117, and more preferably, Nafion® 112. Since the Nafion® membrane is generally supplied in the form of Na for the purpose of storage, it is preferable to use one which experienced pretreatment, in which Na is converted into a sulfonate group (—SO3H) having H ions, in order to remove impurities and improve ion conductivity.

In the diluted fluoroalkylsilane (FAS) solution, the volumetric ratio (v/v) of (heptadecafluoro-1,1,2,2-tetrahydrodecyl)triethoxysilane to propanol is from 1:0.05 to 1:20, and preferably, from 1:0.1 to 1:15. Here, if the volumetric ratio of (heptadecafluoro-1,1,2,2-tetrahydrodecyl)triethoxysilane to propanol is less than 1:0.05, there might be a problem in that solvent uptake and expansion rate within an aqueous methanol solution, i.e. a water (distilled water)-methanol solution, are higher than those of the Nafion® 112 membrane. If the volumetric ratio exceeds 1:20, the solvent content and the expansion rate may be small. So, it is preferable that the volumetric ratio be within this range. In addition, it is preferable that the dipping at the first step be performed at room temperature (15° C. to 35° C.) for 8 to 16 hours.

In the second step of forming hydrophobic silica nanoparticles through hydrolysis and polycondensation of fluoroalkylsilane dispersed through the ion clusters by dipping the Nafion® membrane in a diluted fluoroalkylsilane solution, the dipping at the second step is performed, preferably, at room temperature (15° C. to 35° C.) for 2 to 4 hours. In the aqueous methanol solution that is used, the volumetric ratio (v/v) of water to methanol is 1:1 to 1:3, and preferably, 1:1.5 to 1:2.5.

The third and fourth steps are the steps of drying and re-drying the Nafion® high molecular membrane, in which the hydrophobic silica nanoparticles are formed at the second step. The Nafion® high molecular membrane is dried at a relatively low temperature for a relatively long time at the third step, and is then re-dried at a higher temperature for a short time. Such processing is intended to provide sufficient time for a reaction.

The fifth step is the step of acidifying the re-dried Nafion® high molecular membrane in a 0.1 to 0.5M aqueous $H_2SO_4$ solution. This processing is intended to acidify the re-dried Nafion® high molecular membrane. The $H_2SO_4$ solution that is used is in the range from 0.1 to 0.5M, and preferably, from 0.1 to 0.3M. This range is preferable for the formation the sulfonate group (—SO3H) via acidification.

The cleaning and drying at the sixth step can be performed by any methods that are well known in the art. Although the cleaning and drying methods are not specifically limited, it is preferred that the cleaning be performed using water or supersonic waves.

The present invention provides a Membrane-Electrode Assembly (MEA), which includes the high molecular nanocomposite membrane for a DMFC. Specifically, the MEA of the invention includes a negative electrode, which is bonded on one portion of the high molecular nanocomposite membrane, and a positive electrode, which is bonded to the other portion of the high molecular nanocomposite membrane. Each of the negative and positive electrodes includes a gas dispersion layer and a catalyst layer. The gas dispersion layer generally uses a carbon-based material or a carbon fiber texture as a base material thereof. The porosity of this material is 85% and, preferably, in the range from 85% to 95%. It is preferable to use a material that allows fuel and reactant gas to easily contact the catalyst layer. The gas dispersion layer serves to connect a current that is generated through electrochemical reaction to an external electrical circuit. At the negative electrode, the gas dispersion layer can be formed by impregnating Polytetrafluoroethylene (PTFE) or a copolymer containing the same in a base material, with the content of the PTFE or copolymer ranging from 0.1% to 10% by weight with respect to the total weight of the base material of the gas dispersion layer, so that water and ethanol can easily contact the catalyst layer. At the positive electrode, the gas dispersion layer is formed by impregnating PTFE in a base material at a content ranging from 10% to 40% by weight with respect to the total weight of the base material of the gas dispersion layer in order to increase hydrophobicity. The increased hydrophobicity can prevent water that is generated during the reaction from overflowing. In addition, the catalyst layers on the negative and positive electrodes are generally configured such that homogeneous or heterogeneous platinum (Pt) based electrical catalysts that can create the decomposition of methanol and the reduction of oxygen are uniformly distributed on the surface of conductive carbon. In the present invention, it is preferred that the catalyst layer on the positive electrode be made of a Pt catalyst, and the catalyst layer on the negative electrode be made of a composite catalyst, for example, Pt/Ru catalyst in which Pt and Ru are mixed (at a weight ratio of 50:50). In addition to Pt/Ru, other composite catalysts, such as Pt/Ir, Pt/Ru/Ir, and combinations of Pt/Ir or Pt/Ru/Ir with Ti, can be used. The mixing ratio of Pt to other catalyst components can be properly adjusted depending on the use of electrodes. In addition, the catalyst layer on each of the negative and positive electrodes is manufactured through the steps of: (i) preparing a catalyst ink that contains one of the above-described catalysts as a main ingredient; (ii) uniformly applying the prepared catalyst ink over the gas dispersion layer or the high molecular nanocomposite membrane of the invention via printing, spraying, rolling, or brushing; and (iii) forming the catalyst layer by drying the resultant product.

As an alternative, the MEA can be fabricated by bonding a common electrode to the high molecular nanocomposite membrane of the invention.

In an example, the MEA of the invention is fabricated by arranging a negative electrode on one portion and a positive electrode on the other portion of the high molecular nanocomposite membrane for a DMFC, which is manufactured by a method of the invention, and combining them together through heating and pressing. However, this is not intended to be limiting. Here, the catalyst layer of the negative electrode and the catalyst layer of the positive electrode are arranged to face each other, with the high molecular nanocomposite membrane being interposed between the catalyst layers. That is, the catalyst layers are formed on the surface in which the negative electrode is bonded to the high molecular nanocomposite membrane and on the surface in which the positive electrode is bonded to the high molecular nanocomposite membrane. In addition, a metal net is attached to each outer surface of the gas dispersion layers of the negative and positive electrodes in order to form an electrical pathway.

Furthermore, the present invention relates to a methanol fuel cell, and provides a high molecular electrolyte fuel cell, which is fabricated using the MEA that includes the high molecular nanocomposite membrane for a DMFC.

Hereinafter, the present invention will be described in greater detail with reference to Examples. However, it should be understood that the following Examples do not limit the scope of the invention.

EXAMPLE

Example 1

Manufacture of High Molecular Nanocomposite Membrane for a DMFC

A Nafion® 112 membrane was prepared via pretreatment, in which the membrane was boiled in an aqueous $H_2O_2$ solution (5 wt % of $H_2O_2$ with respect to the total weight of the solution) at 90° C. for one hour, washed using distilled water, boiled in distilled water at 90° C. for one hour, treated in a 0.5M aqueous $H_2SO_4$ solution at 90° C. for one hour, rinsed using distilled water, and washed using distilled water at 90° C. for one hour Afterwards, the pretreated Nafion® 112 membrane was treated in a diluted FAS solution, in which heptadecafluoro-1,1,2,2-tetrahydrodecyl)triethoxysilane (GELEST, INC.) and propanol, as presented in Table 1 below, were mixed at a volumetric ratio of 1:5, at room temperature (25° C.) for 12 hours, and then immersed into an aqueous methanol solution having a volumetric ratio (v/v) of water to methanol of 1:2 at room temperature (25° C.) for 3 hours, so that hydrophobic silica nano particles were formed through hydrolysis and polycondensation of FAS that permeated into ion clusters inside the Nafion® 112 membrane. Subsequently, the resultant product was dried, first, at 80° C. for 24 hours, dried again at 110° C. for 2 hours, and acidified in a 0.2M aqueous $H_2SO_4$ solution for one hour. Afterwards, the acidified high molecular membrane was cleaned using water or supersonic waves, and then sufficiently dried at 50° C., thereby producing a high molecular nanocomposite membrane for a DMFC (10 wt % of silica nano particles with respect to the total weight of the nanocomposite membrane).

TABLE 1

| Structure | $C_{16}H_{19}F_{17}O_3Si$ |
|---|---|
| Formula | $CF_3(CF_2)_7(CH_2)_2-Si(OC_2H_5)_3$ |
| Boiling point | 103-6° C. |
| Freezing point | <0° C. |
| Specific gravity | 1.41 |
| Molecular weight | 610.38 |
| Solubility in water | reacts |

Fabrication Example 1

1 Fabrication of Membrane-Electrode Assembly

A Membrane-Electrode Assembly (MEA) was fabricated using the high molecular nanocomposite membrane manufactured in Example 1 above by placing a fuel electrode and an air electrode to butt against each other, and applying a pressure of 0.060 kg/cm² at 120° C. for 5 minutes via hot pressing. In the resultant MEA, the reaction area of electrodes was 5 cm².

The electrodes used for the fabrication of the MEA were electrodes (commercially available from E-TEK company) that used a carbon cloth as a gas dispersion layer. In the fuel electrode that was used, a Pt catalyst of 40 wt % and a Ru/C catalyst of 20 wt % were loaded at 4.0 mg/cm² total PtRu/cm² (Pt:Ru=1:1). In the air fuel electrode that was used, a Pt/C catalyst of 40 wt % was loaded at 4.0 mg/cm² Pt/cm². In addition, a Nafion® solution (5 wt % solution in water, EW 1100, DuPont) was used as ionomer in the fabrication of the MEA.

2 Fabrication of Unit Cell

Figure 6:
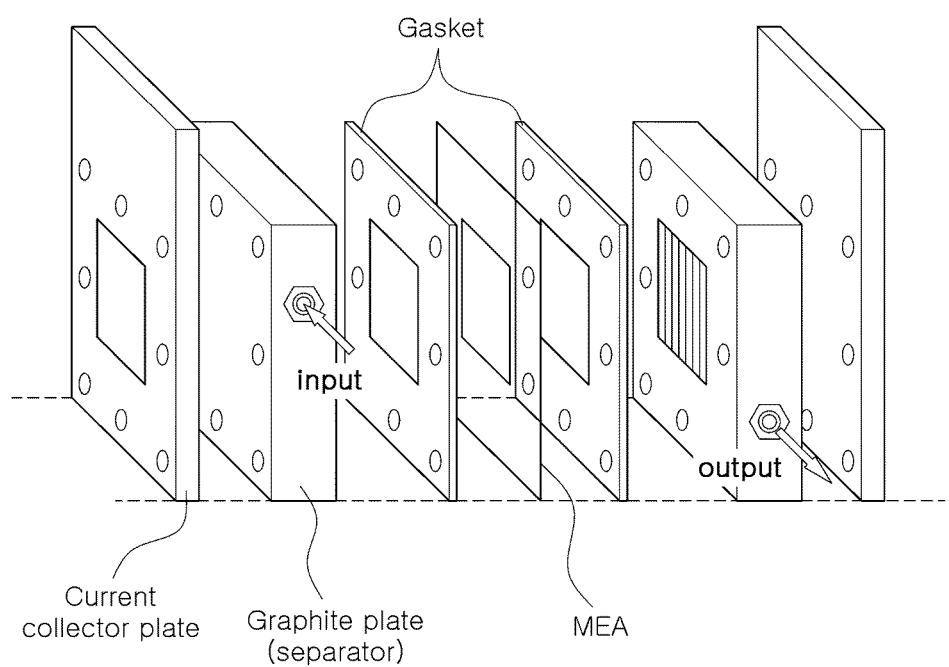
FIG. 6 is a diagram showing the structure of a unit cell fabricated in Fabrication Example 1.

A unit cell shown in FIG. 6 was fabricated using the resultant MEA. The unit cell was fabricated by sealing the other portions except for the reaction area of the MEA using gaskets in order to prevent the mixing or leaking of input fuel, preparing a square graphite having a flow channel with an area of 5 cm² as a separator, and mounting a heater to an end plate made of gold-coated copper, whereby the temperature of the cell could be controlled.

Experimental Example 1

Analysis of Microstructure of Composite Membrane

The high molecular nanocomposite membrane manufactured in Example 1 above was investigated using a Field Emission Scanning Electron Microscope (FESEM) (JSM-6500F, JEOL Ltd.) and an Energy Dispersive X-ray Spectrometer (EDS) (INCA Energy, OXFORD). Here, the distribution of FAS-derived silica particles was determined by measuring the distribution of Si element in the side surface of the nanocomposite membrane.

Side SEM images and EDS experiment results of a commercially available Nafion® 112 membrane and the manufactured nanocomposite membrane are presented in FIGS. 1 (a) and (b), respectively. As shown in FIG. 1 (b), according to the present invention, it can be appreciated that, the mapping of Si element, i.e. a component of the FAA, presents that the Si element was uniformly distributed throughout the side surface of the membrane instead of being maldistributed in some areas. This is believed because the FAS-derived silica nano particles are successfully precipitated in ion clusters inside the Nafion® 112 membrane (where the ion clusters have a diameter of 4 nm, and are connected via channels having a diameter of 1 nm). Therefore, it can be understood that the particles precipitated inside the ion clusters, i.e. pathways for both moisture that acts an important role for the migration of hydrogen ions and methanol that serves anode fuel, act as obstacles, thereby resulting in a decrease in methanol crossover.

However, in the commercially available Nafion® 112 membrane, as shown in FIG. 1 (a), it can be appreciated that substantially no Si element is present or, if any Si element is present, it is maldistributed.

Experimental Example 2

Investigation of Molecule Structure

Figures 2, 3:
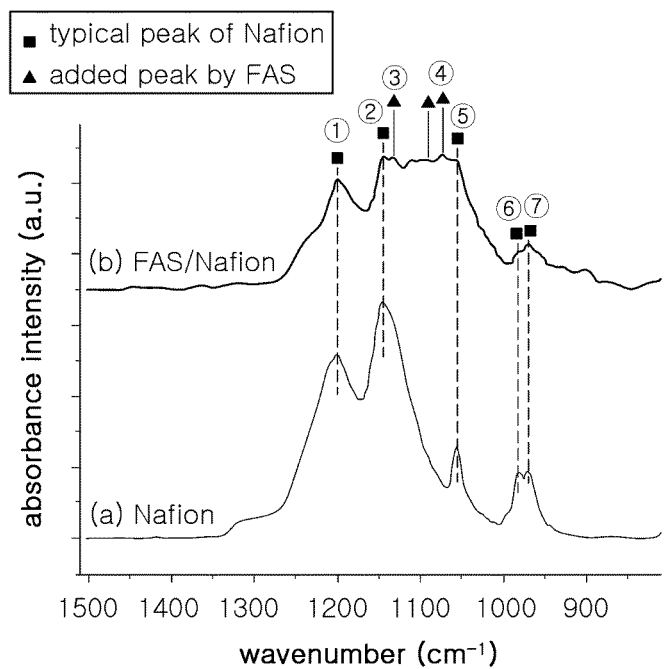
FIGS. 2 and 3 are views showing FT-IR spectrum results obtained by investigating molecular structures inside the Nafion® 112 membrane of Experimental Example 1 and the nanocomposite membrane of Example 1.

The molecular structures inside the Nafion® 112 and the high molecular nanocomposite membrane for a DMFC manufactured in Example 1 were investigated using a Fourier Transform Infrared Spectrometer (FTIR) (VERTEX-70, ERUKER OPTICS), and the results are presented in FIG. 2.

As shown in FIG. 2, in addition to the typical peaks of the Nafion® 112 membrane, added peaks were measured from the FAS/Nafion® composite membrane. The peak of siloxane (Si—O—Si) appearing at 1133 cm$^{-1}$ point (i.e. point ③ in FIG. 2) presents that silica particles are present inside the composite membrane. In addition, the stretching vibration peak of Si—O—C, an FAS linkage, appearing at 1070-1100 cm$^{-1}$ point (i.e. point ④ in FIG. 2) presents that the alkyl groups of FAS, which did not react or partially reacted, still remain.

Example 3

Measurement of Solvent Uptake and Expansion Rate

A measuring instrument fabricated by the inventors was used in order to determine the permeability of methanol. Using this instrument, solvent uptake and expansion rate were measured.

Ion conductivity was measured using an AC Impedance analyzer, the microscopic structure of the membrane was analyzed using an FTIR, and the degree of distribution of FAS-derived silica particles inside the composite membrane was investigated using a Scanning Electron Microscope (SEM).

In order to determine the difference in solvent uptake between the existing Nafion® 112 membrane and the nanocomposite membrane of Example 1 with respect to a typical aqueous methanol solution (5 wt % of methanol+95 wt % of water), the pretreated Nafion® 112 membrane and the nanocomposite membrane of Example 1 were immersed into respective solvents, followed by measuring the wet weights ($W_{wet}$) of the swelled membranes at a predetermined time period. In addition, the dry weights ($W_{dry}$) of the membranes, which were dried in a driver at 70° C. for 24 hours or more, were measured. Based on the measurements, the solvent uptakes were calculated using Formula 1 below:

$$\text{Solvent uptake (\%)} = \frac{W_{wet} - W_{dry}}{W_{dry}} \times 100, \quad \text{Formula 1}$$

where $W_{wet}$ is the weight of the wet membrane, and $W_{dry}$ is the weight of the dry membrane.

In addition, in order to determine the effect of FAS-derived hydrophobic silica nano particles formed inside the ion clusters of the Nafion®, the expansion rates of the existing Nafion® 112 membrane and the nanocomposite membrane of Example 1 were measured. The dry areas ($A_{dry}$) of the membranes, which were dried in a drying chamber at 70° C. for hours, were measured, and the wet areas ($A_{wet}$) of the swelled membranes were measured at a predetermined time period by immersing the membranes into an aqueous methanol solution (5 wt % of methanol+95 wt % of water). Based on the measurements, the expansion rates were calculated using Formula 2 below:

$$\text{Expansion rate (\%)} = \frac{A_{wet} - A_{dry}}{A_{dry}} \times 100, \quad \text{Formula 1}$$

where $A_{wet}$ is the area in the wet membrane, and $A_{dry}$ is the area of the dry membrane.

Figure 4:
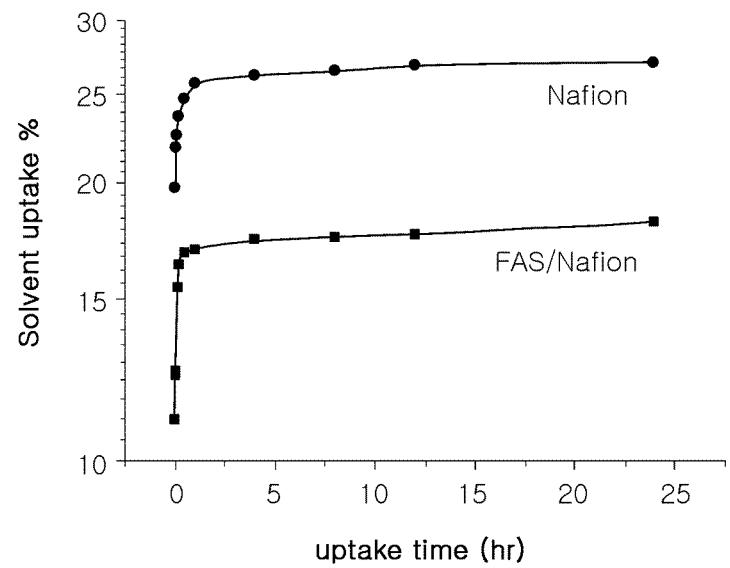
FIG. 4 is a graph showing the result obtained by measuring solvent uptake in Experimental Example 3.

FIGS. 3 and 4 show variations in the solvent uptakes (%) and the expansion rates (%) of the existing Nafion® 112 membrane and the nanocomposite membrane of Example 1 depending on time with respect to an aqueous methanol solution having a concentration of 5 wt %, which is a typical concentration of methanol used as anode fuel of a DMFC.

As shown in FIG. 4, both the Nafion® 112 membrane and the FAS/Nafion® nanocomposite membrane exhibited an increase in the solvent uptakes depending on time, with the variations being insignificant after 1 hour, and the final solvent uptakes being 27.03% and 18.13%. The initial solvent uptake of the Nafion® 112 had a relatively low value of 19.8%, whereas the solvent uptake of the FAS/Nafion® nanocomposite membrane exhibited a relatively low value of 11.1%.

Figure 5:
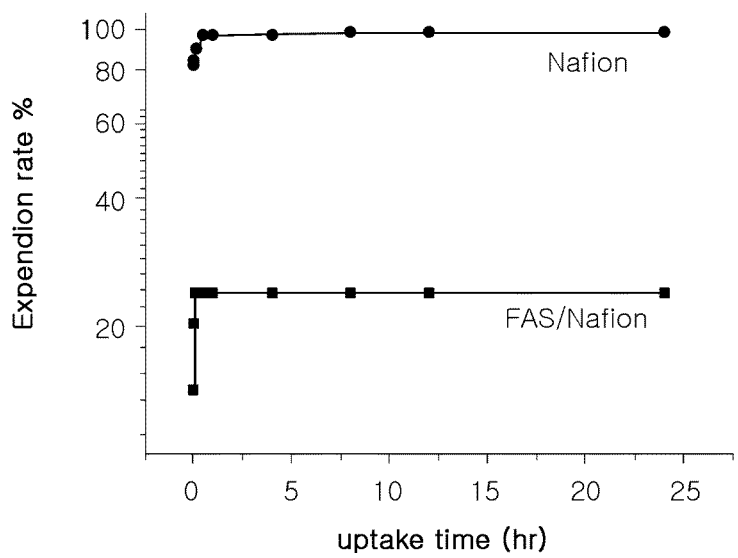
FIG. 5 is a graph showing the result obtained by measuring solvent uptake and expansion rate in Experimental Example 3.

In addition, as shown in FIG. 5, the initial expansion rates of the Nafion® 112 membrane and the nanocomposite membrane of Example 1, which were measured after 5 minutes passed, were 89.9% and 23.8%, the difference of which was more prominent than that of the initial solvent uptakes. Furthermore, it can be appreciated that the expansion rate of the Nafion® 112 membrane slightly increased depending on time, with the final expansion rate being 98.1%, whereas the expansion rate of the nanocomposite membrane of Example 1 maintained a constant value of 23.8%, which was measured at 5 minutes point.

As discussed above, the solvent uptake and the expansion rate of the high molecular nanocomposite membrane for a DMFC of the invention are lower 1.5 times and 4.1 times than those of the commercially available Nafion® membrane. The silica nanoparticles precipitated inside the ion clusters of the base material of the Nafion® membrane become hydrophobic by maintaining the FAS-derived water repellent functional group, and the solid particles effectively act as a barrier that obstructs the migration of methanol by blocking part of the clusters.

Therefore, the solvent uptake and the expansion rate of the high molecular nanocomposite membrane for a DMFC of the invention are smaller than those of the Nafion® 112 because conductive high molecules are intercalated into hydrogen ion-conductive inorganic material having an interlayer structure or a product obtained by peeling off the inorganic material having an interlayer structure is distributed throughout the conductive high molecules.

Since it was observed that the high molecular nanocomposite membrane for a DMFC of the invention was successfully synthesized with the Nafion® membrane, i.e. the base material, to effectively reduce methanol crossover. The methanol fuel cell fabricated using the high molecular nanocomposite membrane for a DMFC of the invention has very excellent performance.

The high molecular nanocomposite membrane for a DMFC of the invention of the present invention can be used as a hydrogen ion-conductive membrane of a fuel cell, thereby improving the energy density and fuel efficiency of the fuel cell.

The foregoing descriptions of specific exemplary embodiments of the present invention have been presented for the purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A high molecular nanocomposite membrane for a direct methanol fuel cell, comprising a perflurorosulfonic acid polymer high molecular membrane in which hydrophobic silica nanoparticles made from a silane compound having a water repellent functional group are dispersed.

2. The high molecular nanocomposite membrane according to claim 1, wherein the silane compound is fluoro(C1-C12)alkylsilane.

3. The high molecular nanocomposite membrane according to claim 2, wherein the silane compound is (heptadecafluoro-1,1,2,2-tetrahydrodecyl)triethoxysilane.

4. The high molecular nanocomposite membrane according to claim 1, wherein the hydrophobic silica nanoparticles have a content ranging from 8.00% to 22.50% by weight with respect to a total weight of the high molecular nanocomposite membrane.

5. A method of manufacturing a high molecular nanocomposite membrane for a direct methanol fuel cell, comprising:
dispersing fluoroalkylsilane throughout ion clusters inside a perflurorosulfonic acid polymer membrane by dipping the perflurorosulfonic acid polymer membrane in a fluoroalkylsilane solution;
forming hydrophobic silica nanoparticles through hydrolysis and polycondensation of the fluoroalkylsilane dispersed through the ion clusters by dipping the perflurorosulfonic acid polymer membrane in an aqueous methanol solution;
drying the perflurorosulfonic acid polymer high molecular membrane, in which the hydrophobic silica nanoparticles are formed, at a temperature ranging from 70° C. to 90° C. for 18 to 26 hours;
re-drying the dried perflurorosulfonic acid polymer high molecular membrane at a temperature ranging from 100° C. to 120° C. for 2 to 3 hours;
acidifying the re-dried perflurorosulfonic acid polymer high molecular membrane in a 0.1 to 0.5M aqueous $H_2SO_4$ solution; and
cleaning and drying the acidified perflurorosulfonic acid polymer high molecular membrane.

6. The method according to claim 5, wherein the perflurorosulfonic acid polymer membrane is pretreated by converting Na into a sulfonate group (—SO3H).

7. The method according to claim 5, wherein the fluoroalkylsilane solution contains (heptadecafluoro-1,1,2,2-tetrahydrodecyl)triethoxysilane and propanol at a volumetric ratio ranging from 1:0.1 to 1:15.

8. The method according to claim 5, wherein dipping the perflurorosulfonic acid polymer membrane in a fluoroalkylsilane solution is performed at a temperature ranging from 15° C. to 35° C. for 8 to 16 hours.

9. The method according to claim 5, wherein dipping the perflurorosulfonic acid polymer membrane in an aqueous methanol solution is performed at a temperature ranging from 15° C. to 35° C. for 2 to 4 hours, and wherein the aqueous methanol solution contains water and methanol at a volumetric ratio ranging from 1:1 to 1:3.

10. The method according to claim 5, wherein cleaning the acidified perflurorosulfonic acid polymer high molecular membrane uses water or supersonic waves.

11. A membrane-electrode assembly comprising:
a high molecular nanocomposite membrane for a direct methanol fuel cell, wherein the high molecular nanocomposite membrane comprises a perflurorosulfonic acid polymer high molecular membrane in which hydrophobic silica nanoparticles made from a silane compound having a water repellent functional group are dispersed;
a negative electrode bonded to one portion of the high molecular nanocomposite membrane; and
a positive electrode bonded to the other portion of the high molecular nanocomposite membrane.

12. The membrane-electrode assembly according to claim 11, wherein the negative electrode includes a gas dispersion layer, and contains polytetrafluoroethylene at a content ranging from 0.1% to 10% by weight with respect to a total weight of the gas dispersion layer.

13. The membrane-electrode assembly according to claim 11, wherein the positive electrode includes a gas dispersion layer, and contains polytetrafluoroethylene at a content ranging from 10% to 40% by weight with respect to a total weight of the gas dispersion layer.

14. The membrane-electrode assembly according to claim 11, further comprising:
a positive electrode catalyst layer formed on a bonding surface between the positive electrode and the high molecular nanocomposite membrane; and
a negative electrode catalyst layer formed on a bonding surface between the negative electrode and the high molecular nanocomposite membrane.

15. The membrane-electrode assembly according to claim 14, wherein the positive catalyst layer is made of a Pt catalyst, and wherein the negative catalyst layer is made of a Pt/Ru composite catalyst.

16. A methanol fuel cell comprising a membrane-electrode assembly wherein the membrane-electrode assembly comprises:
a high molecular nanocomposite membrane for a direct methanol fuel cell, wherein the high molecular nanocomposite membrane comprises a perflurorosulfonic acid polymer high molecular membrane in which hydrophobic silica nanoparticles made from a silane compound having it water repellent functional group are dispersed;
a negative electrode bonded to one portion of the high molecular nanocomposite membrane; and
a positive electrode bonded to the other portion of the high molecular nanocomposite membrane.

\* \* \* \* \*